US012153788B2

(12) United States Patent
Alvi et al.

(10) Patent No.: US 12,153,788 B2
(45) Date of Patent: *Nov. 26, 2024

(54) GENERATING CUSTOMIZED AVATARS BASED ON LOCATION INFORMATION

(71) Applicant: Snap Inc., Santa Monica, CA (US)

(72) Inventors: Sumbul Alvi, Astoria, NY (US); Jonathan Brody, Marina Del Rey, CA (US); Xingkai Eric Chew, Lexington, MA (US); Bryant Detwiller, Hopkinton, NH (US); Joseph Engelman, New York, NY (US); Abdulrahman Khan, Berkeley, CA (US); Sarah Lensing, Brooklyn, NY (US); Robert Lin, Toronto (CA); Gaurav Misra, New York, NY (US); Nathaniel Parrott, Brooklyn, NY (US); Suraj Vindana Samaranayake, New York, NY (US); Andrew Thieck, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,841

(22) Filed: Jul. 10, 2023

(65) Prior Publication Data
US 2023/0350558 A1 Nov. 2, 2023

Related U.S. Application Data

(63) Continuation of application No. 17/527,998, filed on Nov. 16, 2021, now Pat. No. 11,698,722, which is a
(Continued)

(51) Int. Cl.
*G06F 3/04847* (2022.01)
*G06F 3/0482* (2013.01)
(Continued)

(52) U.S. Cl.
CPC ........ *G06F 3/04847* (2013.01); *G06F 3/0482* (2013.01); *G06T 11/60* (2013.01);
(Continued)

(58) Field of Classification Search
CPC ......... G06F 3/048; H04L 51/52; H04L 51/10; G06Q 50/01; H04W 4/21
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| CN | 109863532 A | 6/2019 |

(Continued)

OTHER PUBLICATIONS

"A Whole New Story", Snap, Inc., [Online] Retrieved from the Internet: <URL: https://www.snap.com/en-US/news/>, (2017), 13 pgs.
(Continued)

*Primary Examiner* — Ryan F Pitaro
(74) *Attorney, Agent, or Firm* — Schwegman Lundberg & Woessner, P.A.

(57) ABSTRACT

Method of generating customized avatars based on location information includes processor receiving from first client device location information including a location of the first client device. Processor causes a status interface to be displayed on first client device that includes selectable location items corresponding to locations based on the location information. Processor receives a selection from first client device of first selectable location item and causes avatar selection interface to be displayed on first client
(Continued)

device that includes versions of first avatar performing actions related to the first selectable location item. Processor receives selection of first selectable version of the first avatar and generates a map interface that includes a map display based on the location information and the first selectable version of the first avatar. Processor causes the map interface to be displayed on at least one of the plurality of client devices. Other embodiments are disclosed.

20 Claims, 12 Drawing Sheets

Related U.S. Application Data continuation of application No. 16/277,607, filed on Feb. 15, 2019, now Pat. No. 11,199,957.

(60) Provisional application No. 62/773,922, filed on Nov. 30, 2018.

(51) Int. Cl.
 *G06T 11/60* (2006.01)
 *H04L 51/52* (2022.01)
 *H04L 67/01* (2022.01)

(52) U.S. Cl.
 CPC .......... *H04L 51/52* (2022.05); *G06T 2200/24* (2013.01); *H04L 67/01* (2022.05)

(56) References Cited

U.S. PATENT DOCUMENTS

| | | | |
|---|---|---|---|
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 5,855,008 A | 12/1998 | Goldhaber et al. | |
| 5,880,731 A | 3/1999 | Liles et al. | |
| 5,883,639 A | 3/1999 | Walton et al. | |
| 5,999,932 A | 12/1999 | Paul | |
| 6,012,098 A | 1/2000 | Bayeh et al. | |
| 6,014,090 A | 1/2000 | Rosen et al. | |
| 6,023,270 A | 2/2000 | Brush, II et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,223,165 B1 | 4/2001 | Lauffer | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,484,196 B1 | 11/2002 | Maurille | |
| 6,487,601 B1 | 11/2002 | Hubacher et al. | |
| 6,493,001 B1* | 12/2002 | Takagi | G06T 17/00 715/706 |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,772,195 B1 | 8/2004 | Hatlelid et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,842,779 B1 | 1/2005 | Nishizawa | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,269,426 B2 | 9/2007 | Kokkonen et al. | |
| 7,280,658 B2 | 10/2007 | Amini et al. | |
| 7,315,823 B2 | 1/2008 | Brondrup | |
| 7,342,587 B2 | 3/2008 | Danzig et al. | |
| 7,349,768 B2 | 3/2008 | Bruce et al. | |
| 7,356,564 B2 | 4/2008 | Hartselle et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,468,729 B1 | 12/2008 | Levinson | |
| 7,508,419 B2 | 3/2009 | Toyama et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,607,096 B2 | 10/2009 | Oreizy et al. | |
| 7,636,755 B2 | 12/2009 | Blattner et al. | |
| 7,639,251 B2 | 12/2009 | Gu et al. | |
| 7,639,943 B1 | 12/2009 | Kalajan | |
| 7,650,231 B2 | 1/2010 | Gadler | |
| 7,668,537 B2 | 2/2010 | DeVries | |
| 7,770,137 B2 | 8/2010 | Forbes et al. | |
| 7,775,885 B2 | 8/2010 | Van Luchene et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,088,044 B2 | 1/2012 | Tchao et al. | |
| 8,090,351 B2 | 1/2012 | Klein | |
| 8,095,878 B2 | 1/2012 | Bates et al. | |
| 8,098,904 B2 | 1/2012 | Ioffe et al. | |
| 8,099,109 B2 | 1/2012 | Altman et al. | |
| 8,108,774 B2 | 1/2012 | Finn et al. | |

(56) References Cited

U.S. PATENT DOCUMENTS

| | | |
|---|---|---|
| 8,112,716 B2 | 2/2012 | Kobayashi |
| 8,117,281 B2 | 2/2012 | Robinson et al. |
| 8,130,219 B2 | 3/2012 | Fleury et al. |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,146,005 B2 | 3/2012 | Jones et al. |
| 8,151,191 B2 | 4/2012 | Nicol |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,425,322 B2 | 4/2013 | Gillo et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,581,911 B2 | 11/2013 | Becker et al. |
| 8,583,079 B2 * | 11/2013 | Chawla ............ H04M 3/42374 455/410 |
| 8,594,680 B2 | 11/2013 | Ledlie et al. |
| 8,597,121 B2 | 12/2013 | Andres Del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,700,012 B2 * | 4/2014 | Ferren ............ G02B 13/0065 715/708 |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,756,501 B1 * | 6/2014 | Karam ............ G06F 3/048 715/764 |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,725 B1 | 12/2014 | Sehn |
| 8,924,250 B2 | 12/2014 | Bates et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,201,952 B1 * | 12/2015 | Chau ............ G06Q 30/00 |
| 9,204,252 B2 | 12/2015 | Root |
| 9,225,897 B1 | 12/2015 | Sehn et al. |
| 9,241,184 B2 | 1/2016 | Weerasinghe |
| 9,256,860 B2 | 2/2016 | Herger et al. |
| 9,258,459 B2 | 2/2016 | Hartley |
| 9,298,257 B2 | 3/2016 | Hwang et al. |
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,530,534 B2 * | 12/2016 | Hu ............ H01B 13/30 |
| 9,532,171 B2 | 12/2016 | Allen et al. |
| 9,537,811 B2 | 1/2017 | Allen et al. |
| 9,544,257 B2 | 1/2017 | Ogundokun et al. |

(56) References Cited

U.S. PATENT DOCUMENTS

| | | | |
|---|---|---|---|
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,628,950 B1 | 4/2017 | Noeth et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,710,821 B2 | 7/2017 | Heath | |
| 9,744,466 B2 | 8/2017 | Fujioka | |
| 9,746,990 B2 * | 8/2017 | Anderson | G06F 3/04817 |
| 9,749,270 B2 | 8/2017 | Collet et al. | |
| 9,792,279 B2 * | 10/2017 | Kim | G06F 40/169 |
| 9,792,714 B2 | 10/2017 | Li et al. | |
| 9,839,844 B2 | 12/2017 | Dunstan et al. | |
| 9,854,219 B2 | 12/2017 | Sehn | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,911,222 B2 * | 3/2018 | Setton | G06T 13/80 |
| 9,936,165 B2 | 4/2018 | Li et al. | |
| 9,954,812 B2 * | 4/2018 | Kimura | H04L 51/52 |
| 9,959,037 B2 | 5/2018 | Chaudhri et al. | |
| 9,980,100 B1 * | 5/2018 | Charlton | G06V 20/20 |
| 9,990,373 B2 * | 6/2018 | Fortkort | G06V 40/171 |
| 10,039,988 B2 * | 8/2018 | Lobb | A63F 13/795 |
| 10,061,977 B1 * | 8/2018 | Chang | G06V 40/176 |
| 10,097,492 B2 | 10/2018 | Tsuda et al. | |
| 10,116,598 B2 | 10/2018 | Tucker et al. | |
| 10,155,168 B2 * | 12/2018 | Blackstock | A63F 13/79 |
| 10,219,111 B1 * | 2/2019 | Chen | H04L 51/222 |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,348,662 B2 * | 7/2019 | Baldwin | G06V 40/174 |
| 10,362,219 B2 | 7/2019 | Wilson et al. | |
| 10,432,559 B2 * | 10/2019 | Baldwin | H04L 51/04 |
| 10,475,225 B2 | 11/2019 | Park et al. | |
| 10,504,266 B2 | 12/2019 | Blattner et al. | |
| 10,547,970 B1 * | 1/2020 | Zheng | H04W 4/021 |
| 10,573,048 B2 | 2/2020 | Ni et al. | |
| 10,657,701 B2 | 5/2020 | Osman et al. | |
| 11,199,957 B1 * | 12/2021 | Alvi | H04W 4/02 |
| 11,698,722 B2 * | 7/2023 | Alvi | H04W 4/21 |
| | | | 715/753 |
| 2002/0047868 A1 | 4/2002 | Miyazawa | |
| 2002/0067362 A1 | 6/2002 | Agostino Nocera et al. | |
| 2002/0078456 A1 | 6/2002 | Hudson et al. | |
| 2002/0087631 A1 | 7/2002 | Sharma | |
| 2002/0097257 A1 | 7/2002 | Miller et al. | |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2002/0169644 A1 | 11/2002 | Greene | |
| 2003/0001846 A1 | 1/2003 | Davis et al. | |
| 2003/0016247 A1 | 1/2003 | Lai et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0037124 A1 | 2/2003 | Yamaura et al. | |
| 2003/0052925 A1 | 3/2003 | Daimon et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0148773 A1 | 8/2003 | Spriestersbach et al. | |
| 2003/0164856 A1 | 9/2003 | Prager et al. | |
| 2003/0229607 A1 | 12/2003 | Zellweger et al. | |
| 2004/0027371 A1 | 2/2004 | Jaeger | |
| 2004/0064429 A1 | 4/2004 | Hirstius et al. | |
| 2004/0078367 A1 | 4/2004 | Anderson et al. | |
| 2004/0111467 A1 | 6/2004 | Willis | |
| 2004/0158739 A1 | 8/2004 | Wakai et al. | |
| 2004/0189465 A1 | 9/2004 | Capobianco et al. | |
| 2004/0203959 A1 | 10/2004 | Coombes | |
| 2004/0215625 A1 | 10/2004 | Svendsen et al. | |
| 2004/0243531 A1 | 12/2004 | Dean | |
| 2004/0243688 A1 | 12/2004 | Wugofski | |
| 2005/0021444 A1 | 1/2005 | Bauer et al. | |
| 2005/0022211 A1 | 1/2005 | Veselov et al. | |
| 2005/0048989 A1 | 3/2005 | Jung | |
| 2005/0078804 A1 | 4/2005 | Yomoda | |
| 2005/0097176 A1 | 5/2005 | Schatz et al. | |
| 2005/0102381 A1 | 5/2005 | Jiang et al. | |
| 2005/0104976 A1 | 5/2005 | Currans | |
| 2005/0114783 A1 | 5/2005 | Szeto | |
| 2005/0119936 A1 | 6/2005 | Buchanan et al. | |
| 2005/0122405 A1 | 6/2005 | Voss et al. | |
| 2005/0162419 A1 | 7/2005 | Kim et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0206610 A1 | 9/2005 | Cordelli | |
| 2005/0223066 A1 | 10/2005 | Buchheit et al. | |
| 2005/0288954 A1 | 12/2005 | McCarthy et al. | |
| 2006/0026067 A1 | 2/2006 | Nicholas et al. | |
| 2006/0107297 A1 | 5/2006 | Toyama et al. | |
| 2006/0114338 A1 | 6/2006 | Rothschild | |
| 2006/0119882 A1 | 6/2006 | Harris et al. | |
| 2006/0242239 A1 | 10/2006 | Morishima et al. | |
| 2006/0252438 A1 | 11/2006 | Ansamaa et al. | |
| 2006/0265417 A1 | 11/2006 | Amato et al. | |
| 2006/0270419 A1 | 11/2006 | Crowley et al. | |
| 2006/0287878 A1 | 12/2006 | Wadhwa et al. | |
| 2006/0294465 A1 * | 12/2006 | Ronen | H04M 1/576 |
| | | | 715/706 |
| 2007/0004426 A1 | 1/2007 | Pfleging et al. | |
| 2007/0038715 A1 | 2/2007 | Collins et al. | |
| 2007/0040931 A1 | 2/2007 | Nishizawa | |
| 2007/0073517 A1 | 3/2007 | Panje | |
| 2007/0073823 A1 | 3/2007 | Cohen et al. | |
| 2007/0075898 A1 | 4/2007 | Markhovsky et al. | |
| 2007/0082707 A1 | 4/2007 | Flynt et al. | |
| 2007/0113181 A1 | 5/2007 | Blattner et al. | |
| 2007/0136228 A1 | 6/2007 | Petersen | |
| 2007/0168863 A1 | 7/2007 | Blattner et al. | |
| 2007/0176921 A1 | 8/2007 | Iwasaki et al. | |
| 2007/0192128 A1 | 8/2007 | Celestini | |
| 2007/0198340 A1 | 8/2007 | Lucovsky et al. | |
| 2007/0198495 A1 | 8/2007 | Buron et al. | |
| 2007/0208751 A1 | 9/2007 | Cowan et al. | |
| 2007/0210936 A1 | 9/2007 | Nicholson | |
| 2007/0214180 A1 | 9/2007 | Crawford | |
| 2007/0214216 A1 | 9/2007 | Carrer et al. | |
| 2007/0233556 A1 | 10/2007 | Koningstein | |
| 2007/0233801 A1 | 10/2007 | Eren et al. | |
| 2007/0233859 A1 | 10/2007 | Zhao et al. | |
| 2007/0243887 A1 | 10/2007 | Bandhole et al. | |
| 2007/0244750 A1 | 10/2007 | Grannan et al. | |
| 2007/0255456 A1 | 11/2007 | Funayama | |
| 2007/0281690 A1 | 12/2007 | Altman et al. | |
| 2008/0022329 A1 | 1/2008 | Glad | |
| 2008/0025701 A1 | 1/2008 | Ikeda | |
| 2008/0032703 A1 | 2/2008 | Krumm et al. | |
| 2008/0033930 A1 | 2/2008 | Warren | |
| 2008/0043041 A2 | 2/2008 | Hedenstroem et al. | |
| 2008/0049704 A1 | 2/2008 | Witteman et al. | |
| 2008/0062141 A1 | 3/2008 | Chandhri | |
| 2008/0076505 A1 | 3/2008 | Ngyen et al. | |
| 2008/0092233 A1 | 4/2008 | Tian et al. | |
| 2008/0094387 A1 | 4/2008 | Chen | |
| 2008/0104503 A1 | 5/2008 | Beall et al. | |
| 2008/0109844 A1 | 5/2008 | Baldeschweiler et al. | |
| 2008/0120409 A1 | 5/2008 | Sun et al. | |
| 2008/0132252 A1 * | 6/2008 | Altman | H04W 4/021 |
| | | | 455/457 |
| 2008/0147730 A1 | 6/2008 | Lee et al. | |
| 2008/0148150 A1 | 6/2008 | Mall | |
| 2008/0158222 A1 | 7/2008 | Li et al. | |
| 2008/0158230 A1 | 7/2008 | Sharma et al. | |
| 2008/0168033 A1 | 7/2008 | Ott et al. | |
| 2008/0168489 A1 | 7/2008 | Schraga | |
| 2008/0189177 A1 | 8/2008 | Anderton et al. | |
| 2008/0201638 A1 * | 8/2008 | Nair | H04W 4/029 |
| | | | 715/706 |
| 2008/0207176 A1 | 8/2008 | Brackbill et al. | |

(56) References Cited

U.S. PATENT DOCUMENTS

| | | |
|---|---|---|
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0016617 A1 | 1/2009 | Bregman-amitai et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0099925 A1 | 4/2009 | Mehta et al. |
| 2009/0106672 A1 | 4/2009 | Burstrom |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265236 A1* | 10/2009 | Schultz ............... G06Q 30/0255 707/999.005 |
| 2009/0265604 A1 | 10/2009 | Howard et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0295715 A1* | 12/2009 | Seo ..................... G06F 3/04886 345/156 |
| 2009/0300525 A1 | 12/2009 | Jolliff et al. |
| 2009/0303984 A1 | 12/2009 | Clark et al. |
| 2009/0319607 A1 | 12/2009 | Belz et al. |
| 2009/0327073 A1 | 12/2009 | Li |
| 2010/0010951 A1* | 1/2010 | Miyazaki ............... G06N 5/025 706/46 |
| 2010/0011422 A1 | 1/2010 | Mason et al. |
| 2010/0023885 A1 | 1/2010 | Reville et al. |
| 2010/0062794 A1 | 3/2010 | Han |
| 2010/0070858 A1* | 3/2010 | Morris ................... H04N 5/445 725/39 |
| 2010/0082427 A1 | 4/2010 | Burgener et al. |
| 2010/0082693 A1 | 4/2010 | Hugg et al. |
| 2010/0083148 A1* | 4/2010 | Finn ....................... A63F 13/12 715/764 |
| 2010/0100568 A1 | 4/2010 | Papin et al. |
| 2010/0113065 A1 | 5/2010 | Narayan et al. |
| 2010/0115426 A1 | 5/2010 | Liu et al. |
| 2010/0130233 A1 | 5/2010 | Parker |
| 2010/0131864 A1* | 5/2010 | Bokor .................. A63F 13/533 715/810 |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0234106 A1* | 9/2010 | Kojima .................. A63F 13/63 463/31 |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0102630 A1 | 5/2011 | Rukes |
| 2011/0115798 A1 | 5/2011 | Nayar et al. |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0159890 A1 | 6/2011 | Fortescue et al. |
| 2011/0164163 A1 | 7/2011 | Bilbrey et al. |
| 2011/0183645 A1* | 7/2011 | Chawla .................... H04L 51/04 455/410 |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0239136 A1 | 9/2011 | Goldman et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |

(56) References Cited

U.S. PATENT DOCUMENTS

| | | |
|---|---|---|
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0148033 A1* | 6/2012 | Tibbits .............. H04M 3/42365 |
| | | 379/67.1 |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209685 A1* | 8/2012 | Nealer .............. G06Q 30/0207 |
| | | 705/14.36 |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0103766 A1* | 4/2013 | Gupta ................ G06Q 10/107 |
| | | 709/206 |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0237287 A1* | 9/2013 | Ferren .................... H04W 4/16 |
| | | 455/566 |
| 2013/0249948 A1 | 9/2013 | Reitan |
| 2013/0257877 A1 | 10/2013 | Davis |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0040066 A1* | 2/2014 | Fujioka ............. G06Q 30/0601 |
| | | 705/26.5 |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |

(56) References Cited

U.S. PATENT DOCUMENTS

| | | |
|---|---|---|
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0206349 A1 | 7/2015 | Rosenthal et al. |
| 2015/0222814 A1 | 8/2015 | Li et al. |
| 2015/0245168 A1* | 8/2015 | Martin .................. H04W 4/029 715/751 |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0134840 A1 | 5/2016 | Mcculloch |
| 2016/0180887 A1 | 6/2016 | Sehn |
| 2016/0182422 A1 | 6/2016 | Sehn et al. |
| 2016/0182875 A1 | 6/2016 | Sehn |
| 2016/0234149 A1 | 8/2016 | Tsuda et al. |
| 2016/0239248 A1 | 8/2016 | Sehn |
| 2016/0277419 A1 | 9/2016 | Allen et al. |
| 2016/0321708 A1 | 11/2016 | Sehn |
| 2016/0358283 A1* | 12/2016 | Regala .................. A63F 13/30 |
| 2017/0006094 A1 | 1/2017 | Abou Mahmoud et al. |
| 2017/0061308 A1 | 3/2017 | Chen et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0287006 A1 | 10/2017 | Azmoodeh et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0146014 A1* | 5/2018 | Arzunian ................ G06Q 50/01 |
| 2018/0296923 A1* | 10/2018 | Nims .................. A63F 13/65 |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0087468 A1* | 3/2019 | Agarwal ................ G06F 16/487 |
| 2019/0188920 A1 | 6/2019 | Mcphee et al. |
| 2022/0118362 A1* | 4/2022 | Nims .................. A63F 13/5258 |
| 2022/0147236 A1 | 5/2022 | Alvi et al. |

FOREIGN PATENT DOCUMENTS

| | | |
|---|---|---|
| CN | 110168478 A | 8/2019 |
| EP | 2051480 A1 | 4/2009 |
| EP | 2151797 A1 | 2/2010 |
| EP | 2184092 A2 | 5/2010 |
| GB | 2399928 A | 9/2004 |
| JP | 2001230801 A | 8/2001 |
| JP | 5497931 B2 | 3/2014 |
| KR | 19990073076 A | 10/1999 |
| KR | 20010078417 A | 8/2001 |
| KR | 101445263 B1 | 9/2014 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2003094072 A1 | 11/2003 |
| WO | WO-2004095308 A1 | 11/2004 |
| WO | WO-2006107182 A1 | 10/2006 |
| WO | WO-2006118755 A2 | 11/2006 |
| WO | WO-2007092668 A2 | 8/2007 |
| WO | WO-2007134402 A1 | 11/2007 |
| WO | WO-2009043020 A2 | 4/2009 |
| WO | WO-2011040821 A1 | 4/2011 |
| WO | WO-2011119407 A1 | 9/2011 |
| WO | WO-2012139276 A1 | 10/2012 |
| WO | WO-2013008238 A1 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 16/277,607, Final Office Action mailed Sep. 25, 2020", 18 pgs.

"U.S. Appl. No. 16/277,607, Non Final Office Action mailed May 7, 2020", 15 pgs.

"U.S. Appl. No. 16/277,607, Notice of Allowance mailed Apr. 29, 2021", 7 pgs.

"U.S. Appl. No. 16/277,607, Notice of Allowance mailed Aug. 9, 2021".

"U.S. Appl. No. 16/277,607, Response filed Jan. 25, 2021 to Final Office Action mailed Sep. 25, 2020", 11 pgs.

"U.S. Appl. No. 16/277,607, Response filed Aug. 7, 2020 to Non Final Office Action mailed May 7, 2020", 10 pgs.

"U.S. Appl. No. 17/527,998, Non Final Office Action mailed Sep. 15, 2022", 24 pgs.

"U.S. Appl. No. 17/527,998, Notice of Allowance mailed Feb. 23, 2023", 8 pgs.

"U.S. Appl. No. 17/527,998, Preliminary Amendment filed Feb. 1, 2022", 9 pgs.

(56) References Cited

OTHER PUBLICATIONS

"U.S. Appl. No. 17/527,998, Response filed Jan. 17, 2023 to Non Final Office Action mailed Sep. 15, 2022", 13 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
U.S. Appl. No. 16/277,607, filed Feb. 15, 2019, Generating Customized Avatars Based on Location Information.
U.S. Appl. No. 17/527,998, filed Nov. 16, 2021, Generating Customized Avatars Based on Location Information.

\* cited by examiner

GENERATING CUSTOMIZED AVATARS BASED ON LOCATION INFORMATION

CROSS REFERENCED TO RELATED APPLICATIONS

This application is a continuation of U.S. patent application Ser. No. 17/527,998, filed Nov. 16, 2021, which application is a continuation of U.S. patent application Ser. No. 16/277,607, filed Feb. 15, 2019, now issued as U.S. Pat. No. 11,199,957, which application claims priority to U.S. Provisional Patent Application Ser. No. 62/773,922, filed Nov. 30, 2018, the contents of which are incorporated herein by reference in their entirety.

BACKGROUND

The popularity of electronic messaging, particularly instant messaging, continues to grow. Users increasingly share media content items such as electronic images and videos with each other, reflecting a global demand to communicate more visually.

Users also increasingly use customized avatars that can be personalized to represent the users in various applications, video games, messaging services, etc. Since the customized avatars can be generated in a different array of situations, displaying various emotions, or even be animated, the users are able to communicate their feelings and actions more accurately in the systems using the customized avatars.

With the increasing number of users on social networking systems, each user also has a growing network of individuals that she follows. Therefore, in order to maintain the user's engagement on social networking systems, it is paramount that the systems have the ability to present to each user the media content items that are most interesting or relevant to her. In addition to the need to curate the media content items, the social networking systems are also presented with the challenge of providing a graphical user interface that captivates the user's attention and allows her to view the curated media content items and further interact the network of individuals that she follows.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by providing the user increased control over his customized avatar's appearance on the system's communication interface. Based on the current location of the user, the user may select to have the customized avatar appear to perform actions related to the current location of the user. For example, if the user is currently exercising at the gym, the user may select the customized avatar that is wearing his gym clothes and performing exercises.

By involving the user's avatars in the communication interface, the messaging system provides the users new way to communicate and express themselves using the system. This will increase the engagement of users with the system as well as increase the length of time the users maintain presence on the system.

Further, the customized avatar may also be displayed with a preview of new media content items that the first user has uploaded. For the other users connected on the communication server system to the first user, this interface provides better access to new media items and electronic messages.

Figure 1:
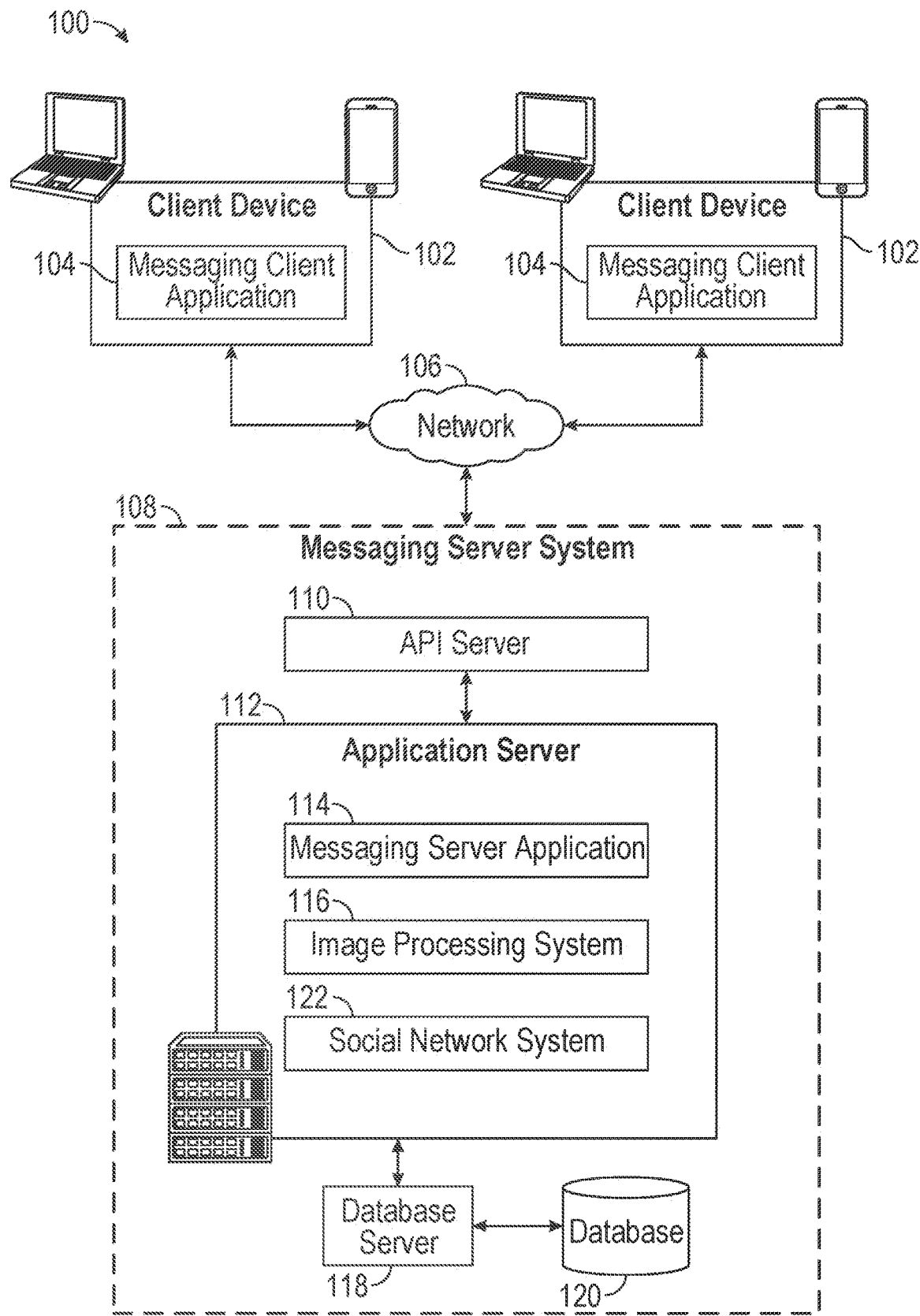
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
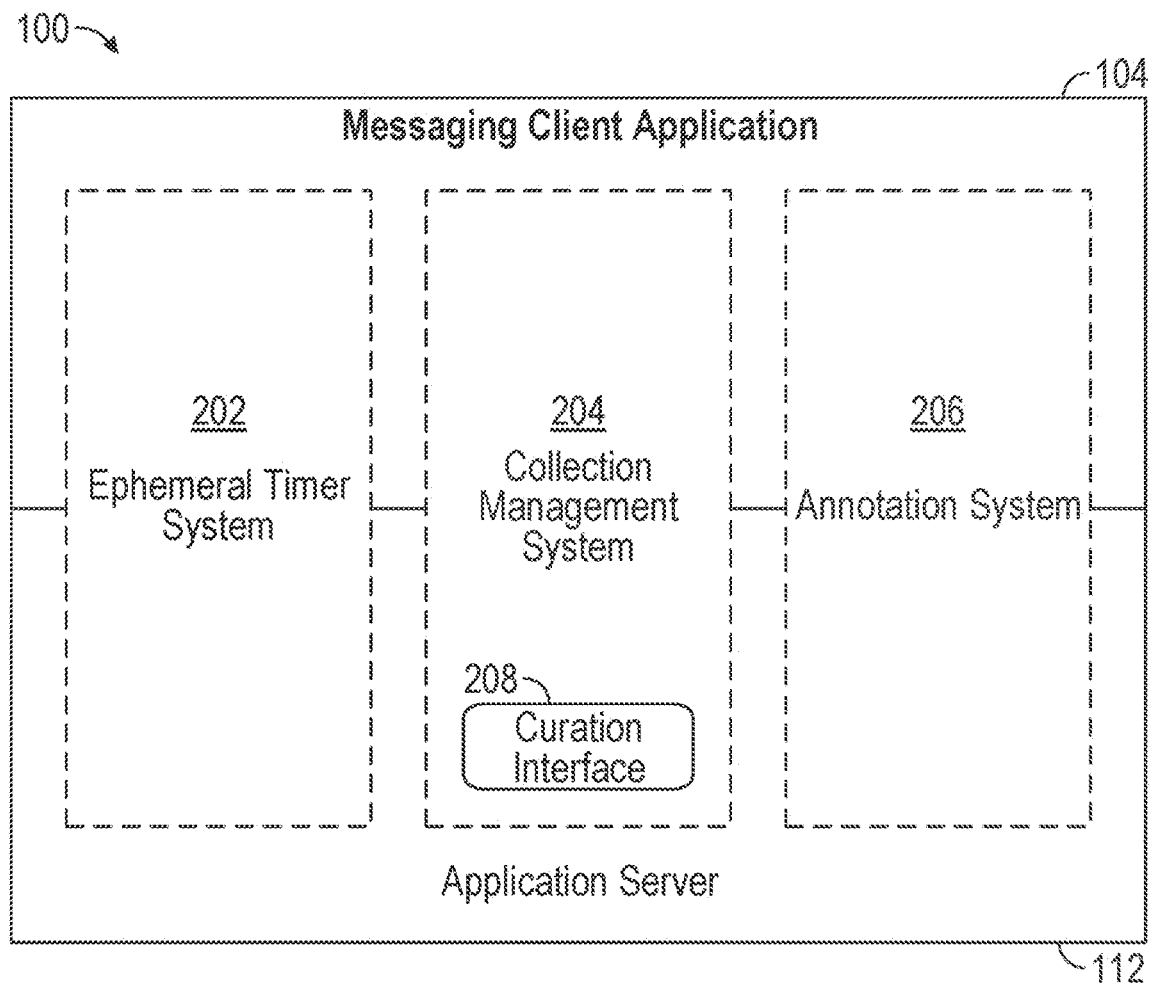
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
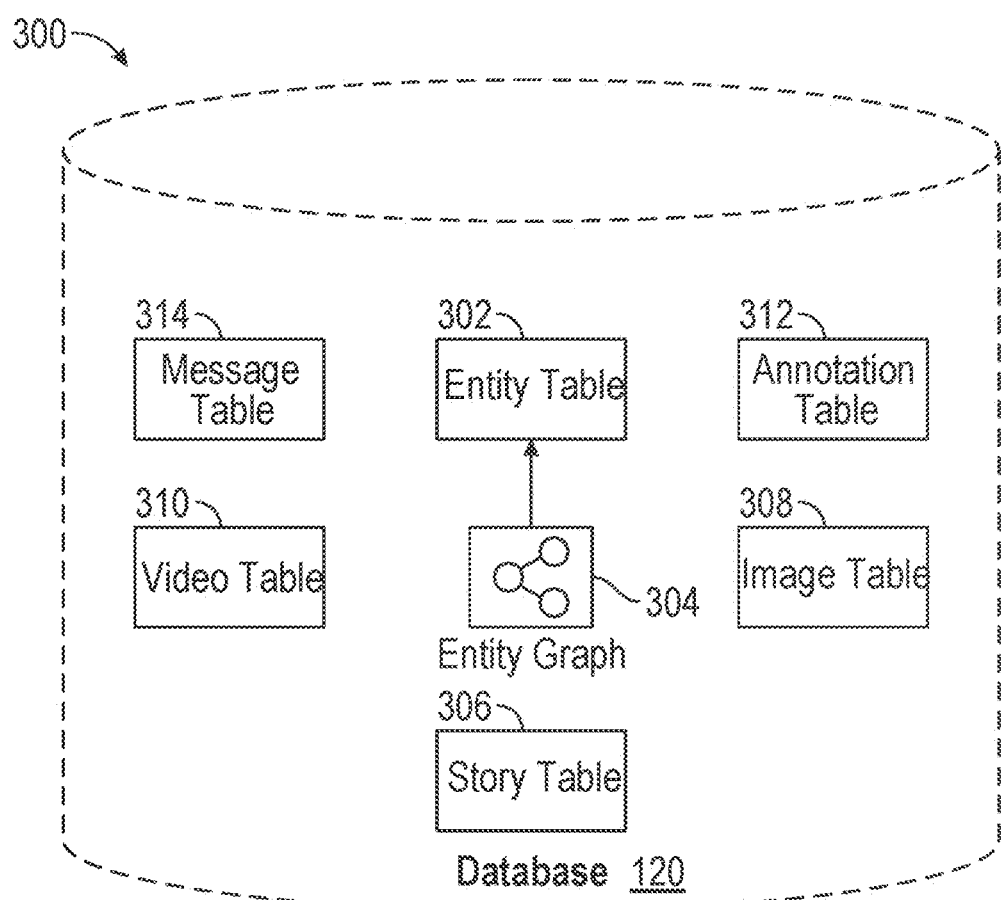
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

As used herein, an "electronic message" may refer to any message in electronic form, such as an email, a short message service (SMS) message, a multimedia message service (MMS) message, an instant message (IM), Internet Relay Chat (IRC) messages, as well as any other form of real-time, near-real-time, synchronous, or asynchronous electronic messaging format. Embodiments of the present disclosure may generate and present customized images for use within electronic messages such as SMS or MMS texts and emails. The customized images may also be utilized in conjunction with the stories, filters, and ephemeral messaging functionality discussed herein.

Figure 4:
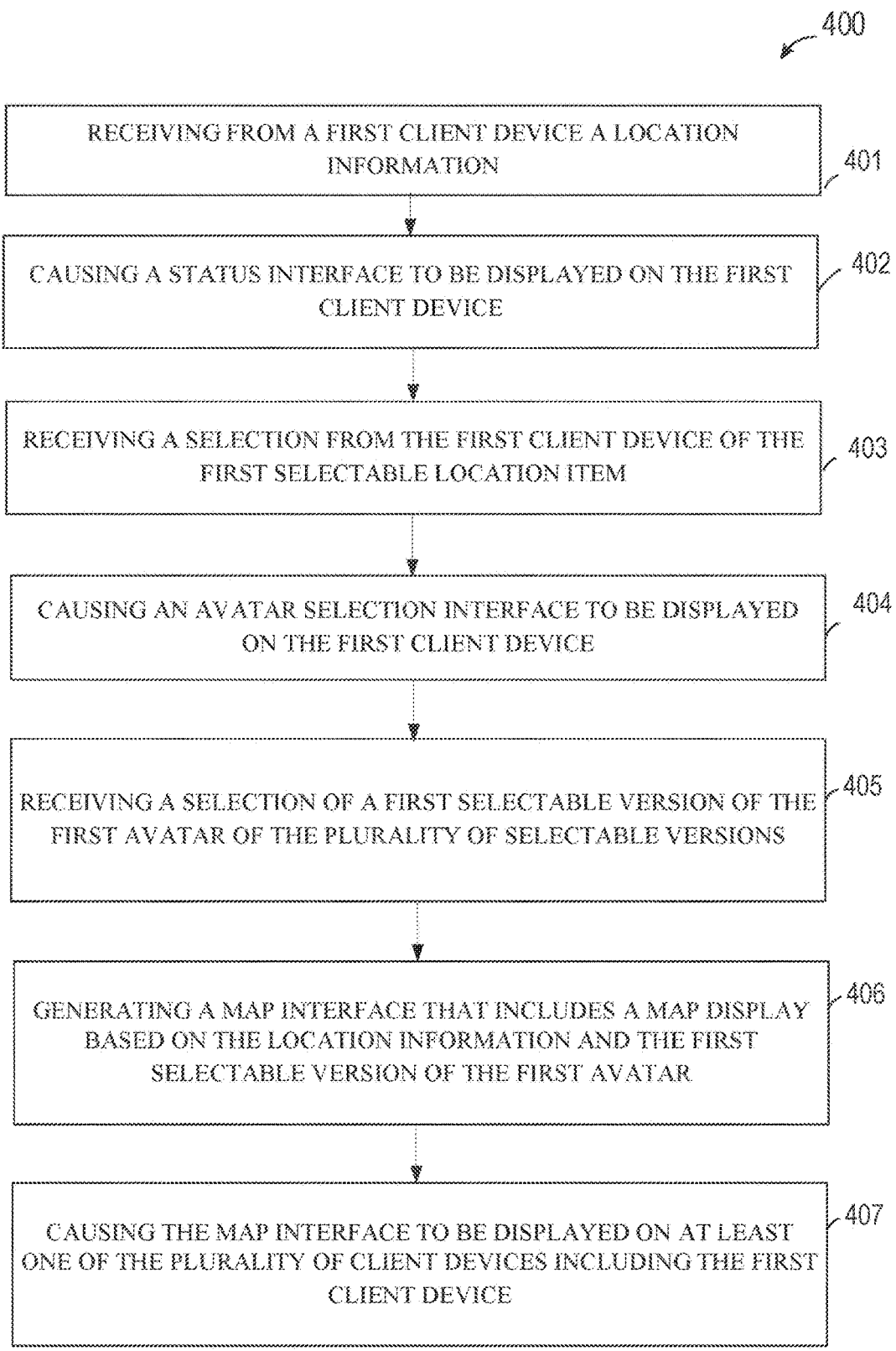
FIG. 4 is an exemplary flow diagram of a process according to various aspects of the disclosure.

FIG. 4 is an exemplary flow diagram of a process according to various aspects of the disclosure. Although the flowchart may describe the operations as a sequential process, many of the operations can be performed in parallel or concurrently. In addition, the order of the operations may be re-arranged. A process is terminated when its operations are completed. A process may correspond to a method, a procedure, etc. The steps of method may be performed in whole or in part, may be performed in conjunction with some or all of the steps in other methods, and may be performed by any number of different systems, such as the systems described in FIG. 1 and/or FIG. 7.

FIG. 4 depicts an exemplary process 400 of generating customized avatars based on location information according to various aspects of the present disclosure. The process 400 may be performed by a processor included in the application server of the messaging server system or by a processor included in a client device.

At Block 401 of process in FIG. 4, the processor receives from a first client device a location information that includes a location of the first client device. The location information may be received from a location sensor included in the first client device. For example, the first client device may include a GPS unit that provides coordinates of the location of the first client device to the processor.

Figure 5A:
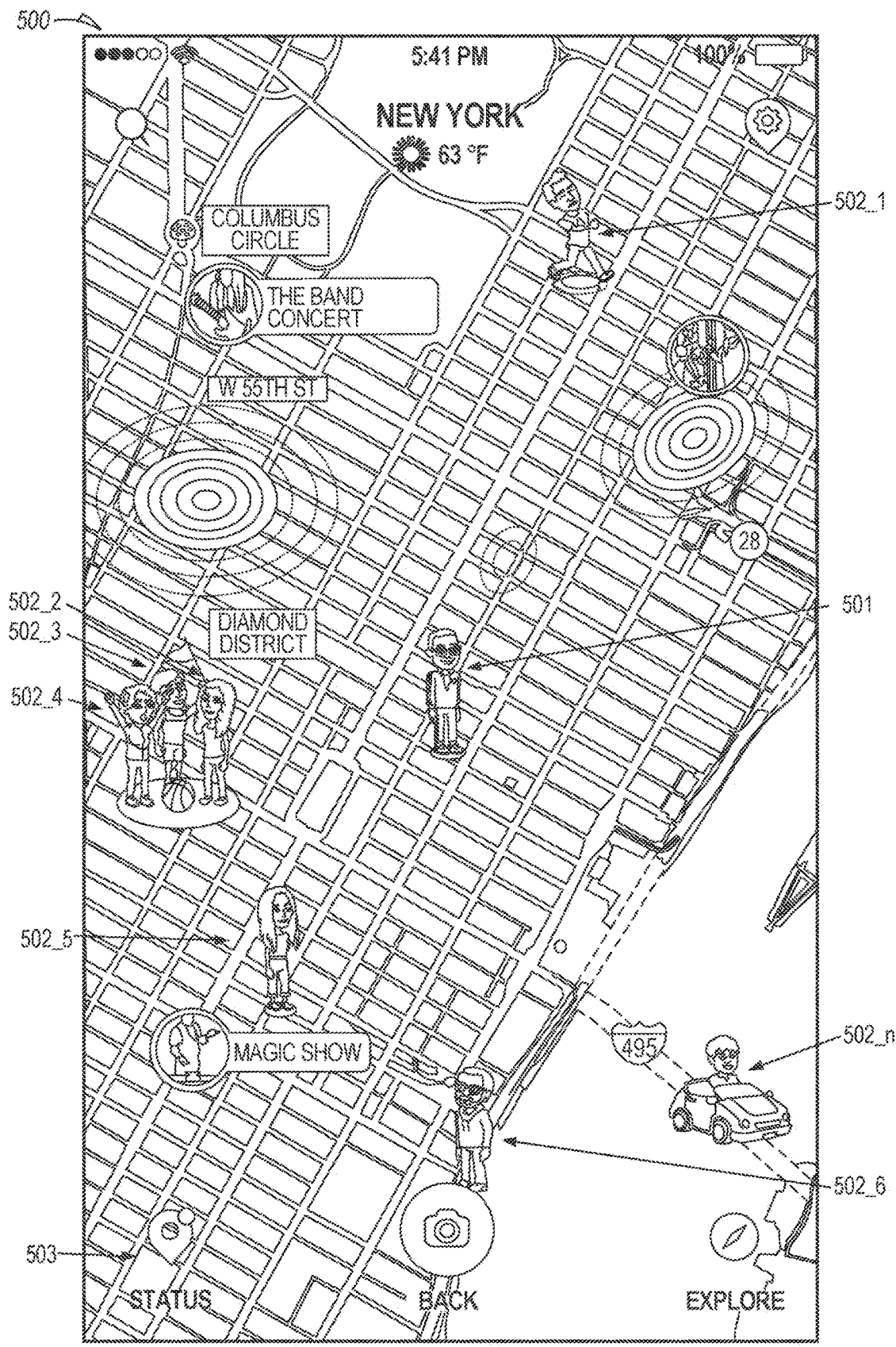
FIGS. 5A-5F are exemplary interfaces according to various aspects of the disclosure.

In FIG. 5A, an example of a map interface 500 that is displayed on the first client device is illustrated. The map interface 500 includes a first avatar 501 associated with the user of the first client device ("first user"), and a plurality of avatars 502_1 to 502_*n* (n>1) associated with users of other client devices that are connected to the first user on the messaging server system.

As used herein, an "avatar" of a user is any visual representation of user. The avatar of a user or individual may be any image resembling or otherwise associated with the user or individual. The avatar of a user may be based on characteristics derived from images of the user in conjunction with the avatar characteristics identified from the user's relationships with other users. Alternatively or additionally, the user may select and customize characteristics of the user's avatar via the user's computing device (i.e., customized avatar characteristics). Such customized avatar characteristics may include, for example, the user's bodily features (e.g., muscular, thin, etc.), facial features, clothing and accessories, text displayed in conjunction with the avatar, and images displayed in conjunction with the avatar. The avatar characteristics may be received or retrieved from a variety of sources, such as the local memory of a client device 102 as well as from other systems and devices, such as a database or server.

As shown in FIG. 5A, the first user's avatar 501 is illustrated at the location on the map interface 500 that corresponds to the current location of the first client device. The processor uses the location information received at Block 401 in FIG. 4 to determine the location of the map interface 500 at which to place the first user's avatar 501. Similarly, the avatars 502_1 to 502_*n* are illustrated on the map interface at locations corresponding to the locations of their client devices. In FIG. 5A, the avatars 502_2 to 502_4 are illustrated in a cluster of avatars which indicates that the users associated with avatars 502_2 to 502_4 are currently assembled at the location corresponding to the location on the map interface 500.

Figure 5B:
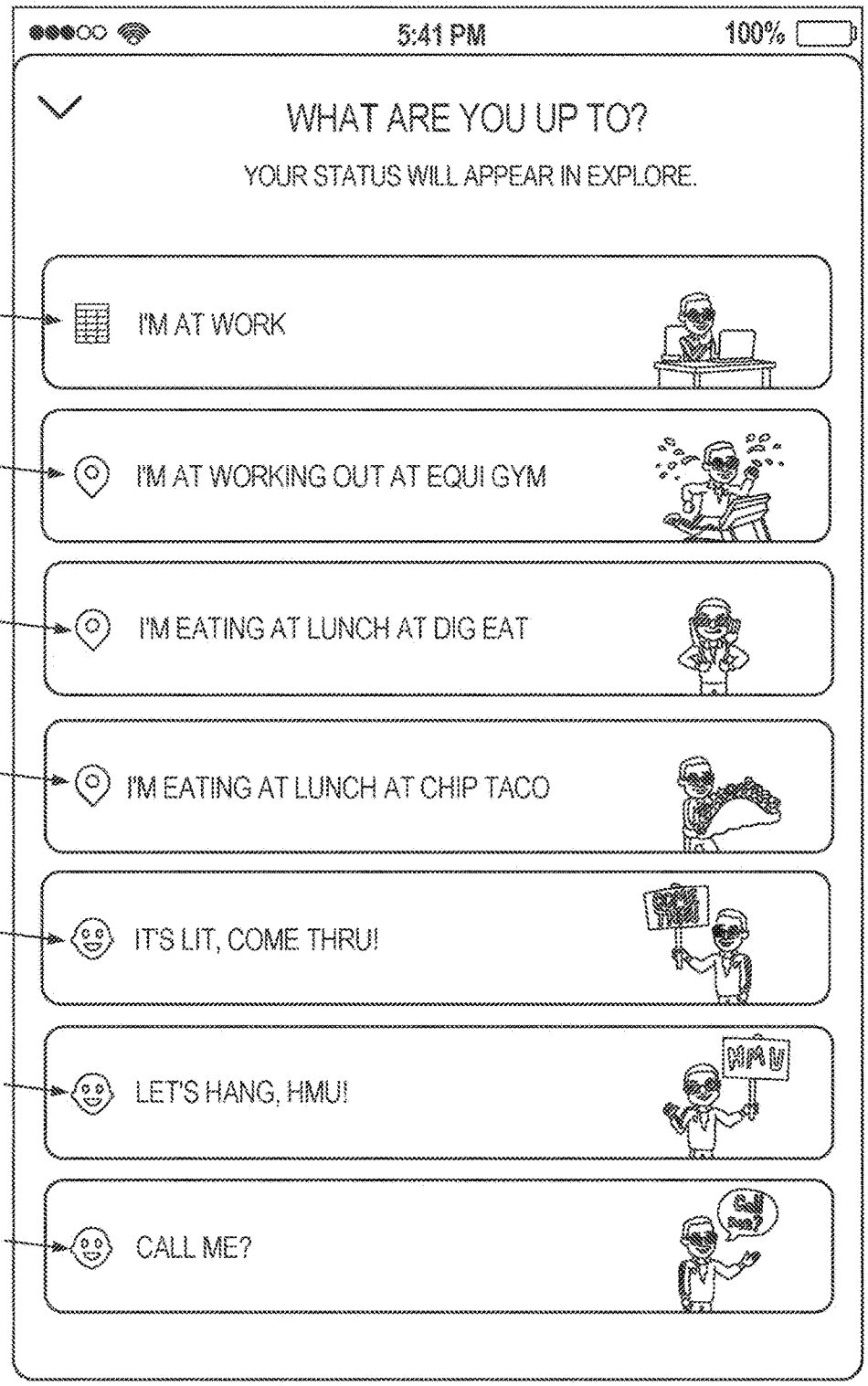

At Block 402, the processor causes a status interface 510 to be displayed on the first client device. In one embodiment, the first user may select the interface item 503 on the map interface 500 to request the status interface be displayed on the first client device. FIG. 5B illustrates an example of the status interface 510 displayed on the first client device. The status interface 510 includes a selectable personal location item 511 corresponding to a personalized location (e.g., work), selectable location items 512_1 to 512_*m* (m>1), and a plurality of selectable mood items 513_1 to 513_*p* (p>1) corresponding emotion updates. Each selectable personal location item 511, selectable location items 5121 to 512_*m* and selectable mood items 513_1 to 513_*p* may also include a status message related to the selectable item.

The selectable location items correspond to locations that appear on the status interface 510 based on the location information that was received from the first client device. For example, the locations that appear on the status interface 510 are within a predetermined distance of the location of the first client device (e.g., 0 to 50 meters). In some embodiments, the locations that appear on the status interface 510 are based on the probability that the first user is at a given location that is within the predetermined distance. The processor may determine the probability based on, for example, the distance between a location and the location of the first client device, the visitation habits (e.g., previously stored locations associated with the first client device), the time of day, and the day of the week.

In FIG. 5B, the selectable personal location item 511 corresponding to a personalized location (e.g., work). The first user may have previously provided the location details including the address of his workplace to generate the selectable personal location item 511. While the status interface illustrates a single selectable personal location item 511, the status interface may include a plurality of selectable personal location items (e.g., home, work, school, etc.). While not shown in FIG. 5B, the status interface 510 may also include a selectable item to create a personalized location. The personalized location may be a home location, a work location, and a school location. The personalized location may also be a location that is personal to the first user (e.g., secret hideout, third tree in the parking lot, favorite pizza by the slice, etc.). In this embodiment, the processor causes a personal location setting interface to be displayed on the first client device. The personal location setting interface includes interface elements to receive details of the personalized locations that include for example, a name for the location (e.g., secret hideout), an address associated with the location (e.g., address of the secret hideout), a type of location (e.g., restaurant or bar), or a location-based activity (e.g., first user likes to eat and drink at the secret hideout).

In FIG. 5B, the selectable mood items are associated with emotion updates that may be selected by the user to update his current mood or feelings. For example, the first user may select the mood item 513_3 ("Call me") if he wants other users to contact him.

Referring back to Block 403 in FIG. 4, the processor receives a selection from the first client device of the first selectable location item that is associated with a first location. In FIG. 5B, the first client selects the selectable location item 512_1 that is associated with a gym (e.g., "Equi Gym").

Figure 5C:
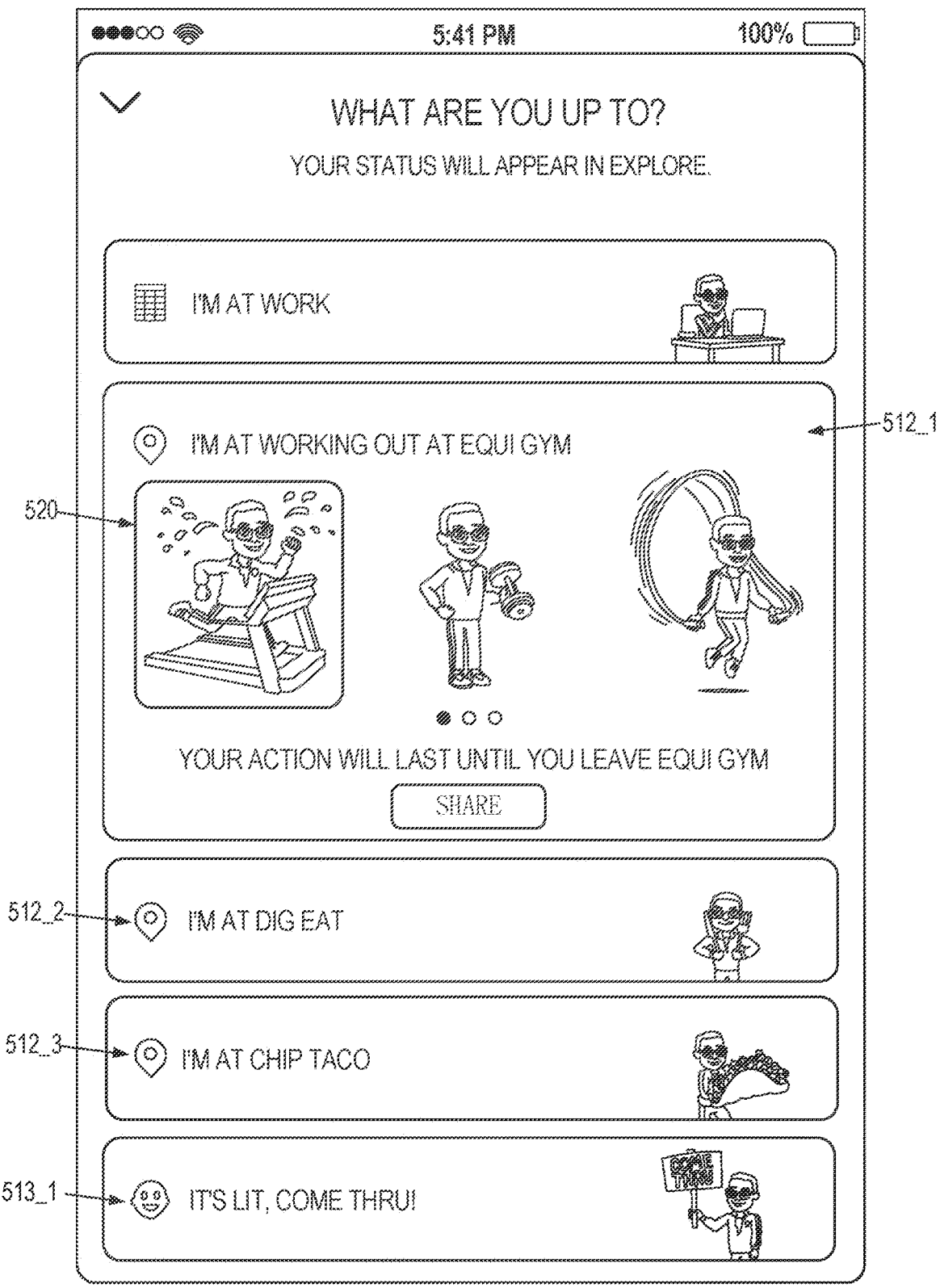

At Block 404, the processor causes an avatar selection interface 520 to be displayed on the first client device. As shown in FIG. 5C, the avatar selection interface 520 that is displayed on the first client device includes a plurality of versions of the first avatar performing actions related to the first selectable location item (e.g., different activities related to working out at a gym). The different versions of the first avatar may be presented in a carrousel that may scrolled through via a touch screen or display of the first client device. In FIG. 5C, the avatar selection interface 520 is an expanded view of the first selectable location item that is caused to be displayed when the first user selects the first selectable location item on the first client device. In FIG. 5C, the selectable location items 512_1 to 512_*n* include status messages, respectively. For example, the selectable location item 512_1 includes the status message "I'm working out at Equi Gym".

At Block 405, the processor receives a selection of a first selectable version of the first avatar. For example, in FIG. 5C, the first user selects the version of the first avatar that is lifting weights.

Figure 5D:
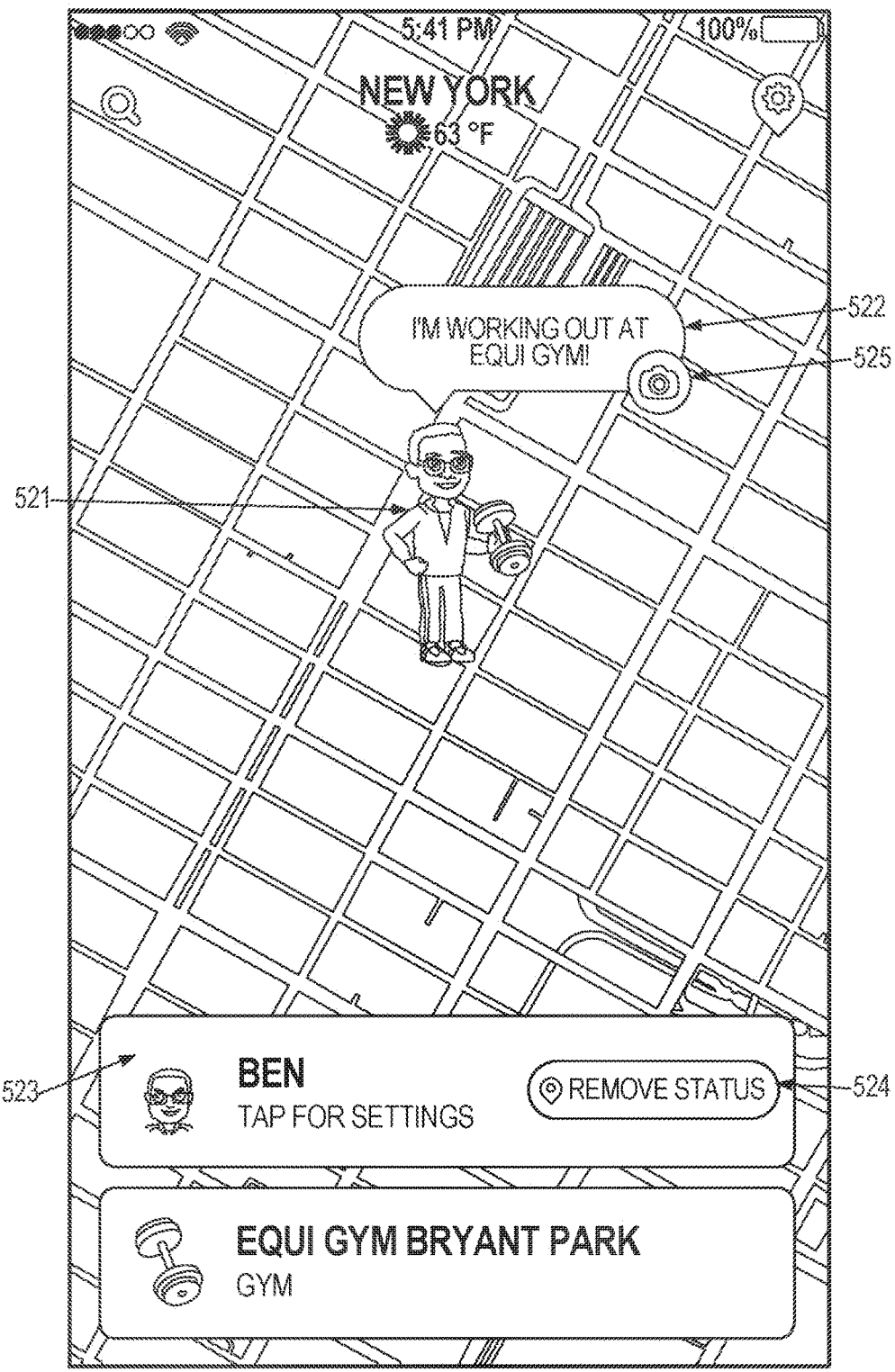

At Block 406, the processor generates a map interface that includes a map display based on the location information and the first selectable version of the first avatar 521. As shown in FIG. 5D, the map interface 500 is updated to include the version of the first avatar that is lifting weights 521 at the location corresponding to the gym ("Equi Gym"). In one embodiment, the map interface 500 also includes the first status message in association with the first selectable version of the first avatar. In FIG. 5D, the map interface 500 includes the status message 522 "I'm working out at Equi Gym" and the status message 522 is illustrated as a speech bubble associated with the first avatar 501.

In one embodiment, while the first user is at the gym, the processor causes the map interface 500 to include the version of the first avatar that is lifting weights 521 with his status message 522 at the location corresponding to the gym. When the processor determines that the location of the first client device does not correspond to the first location, the processor updates the map interface by replacing the first selectable version of the first avatar 521 with a default version of the first avatar 501. The default version of the first avatar 501 is included on the map interface 500 at a location on the map corresponding to the updated location of the first client device. In FIG. 5D, the identity card 523 associated with the first user displayed on the first client device. The identity card 523 includes an interface item 524 ("Remove Status") that allows the first user to replace the first selectable version of the first avatar 521 with a default version of the first avatar 501 and remove the status message 522.

Figure 5E:
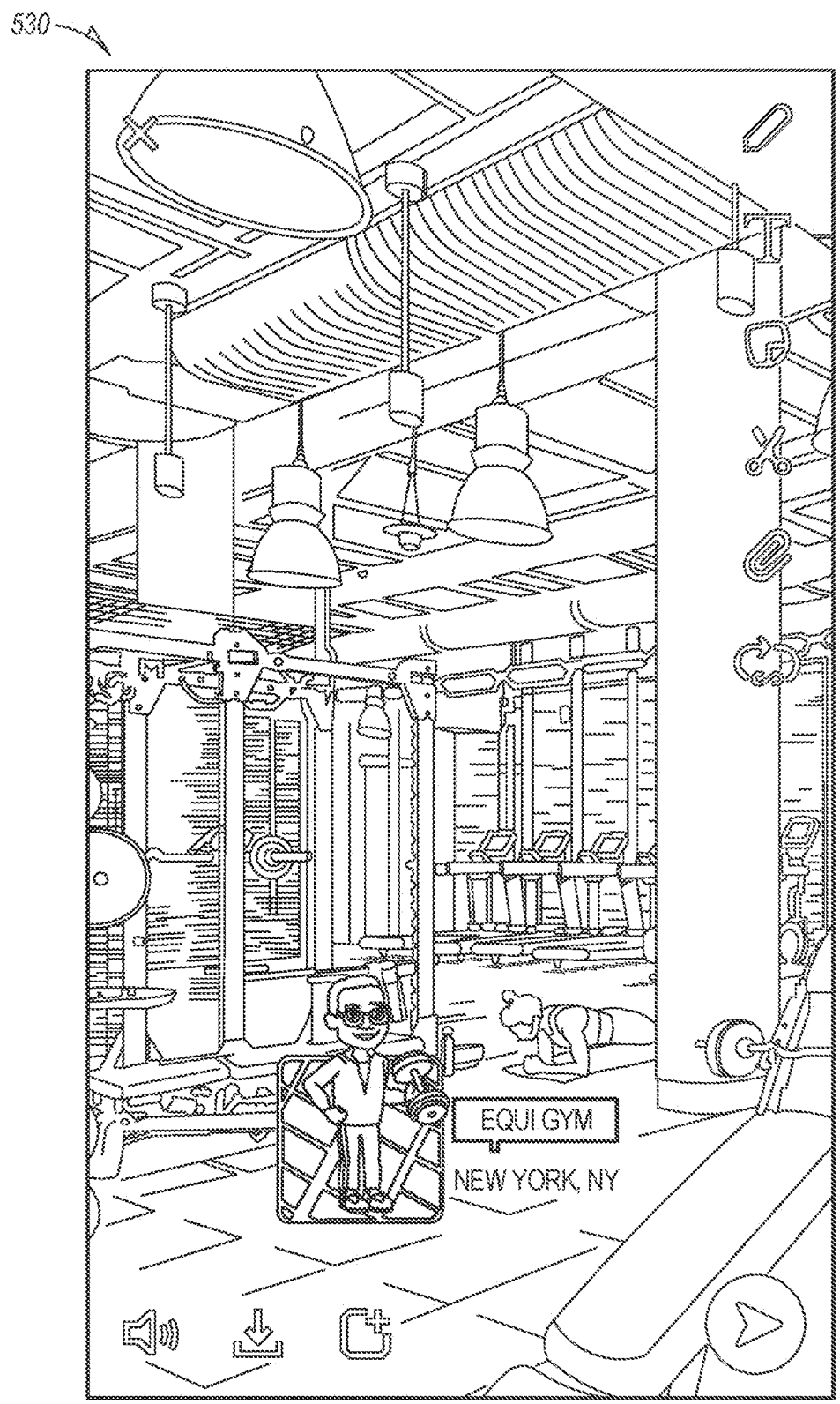

In FIG. 5D, the map interface 500 includes an interface item 525. When the first user activates the interface item 525, the camera that is included in the first client device is activated to allow the first user to capture media content items (e.g., picture, video, audio, etc.). FIG. 5E illustrates an interface 530 that includes a media content item captured using the camera on the first client device that is displayed on the first client device. In this embodiment, the processor receives a first media content item associated with the first status message 522 and causes a preview item of the first media content item to be displayed with the first status message. The preview item of the first media content item is illustrated in as preview 526 in FIG. 5F.

At Block 407, the processor causes the map interface to be displayed on at least one of the plurality of client devices including the first client device. In this embodiment, the processor causes other client devices associated with users that are connected to the first user on communication server system to display the map interface including the version of the first avatar that is lifting weights 521 with his status message 522 and preview 526 at the location corresponding to the gym. In one embodiment, the map interface displayed on a second client device that is associated with a second user who is connected on the communication server system to the first user is different from the map interface displayed on the first client device. Specifically, the second user's map interface includes avatars that are connected to the second user on the communication server system as well as personalized locations that are set by the second user.

Figure 5F:
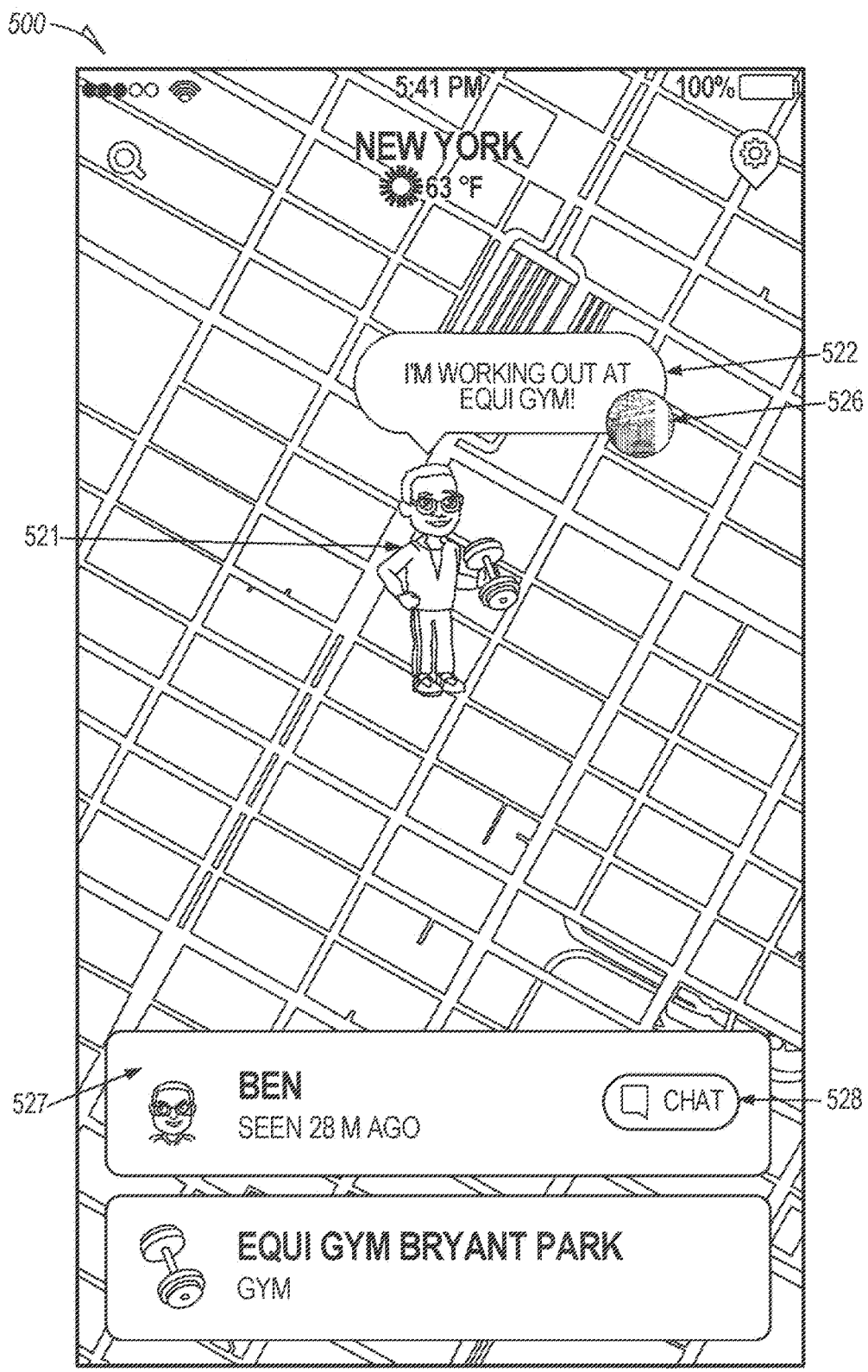

FIG. 5F is an example of a map interface zoomed in on the first avatar that is displayed on a second user's interface. In response to selecting the first avatar displayed on the second client device, an identity card 527 associated with the first user is displayed on the second client device and the interface item 528 may be selected to request a communication session between the first and second users.

In one embodiment, the processor receives from a second client device location information that includes the location of the second client device. Similar to the first client device, the second client device may include a GPS that provides the coordinates of the location of the second client device to the processor.

The processor may then determine whether the location of the second client device is within a threshold distance from the location of the first client device. For example, the threshold distance may be the size of the location (e.g., the gym) corresponding to the location of the first client device or may be a set distance (e.g., 50 meters) from the first client device. If the processor determines that the location of the second client device is within a threshold distance from the location of the first client device, the processor updates the map interface by replacing the first selectable version of the first avatar with an image of the first avatar and a second avatar at a location on the map display corresponding to the location of the first client device. In this example, the second avatar is associated with a second user of the second client device.

In one embodiment, the processor receives a media content item (e.g., picture, video, text, audio, etc.) that includes a location from the first client device. For example, the first user may have applied a filter or a lens on the media content item that linked to a geographic location. In this embodiment, the processor updates the map interface 500 to include a version of the first avatar that is related the geographic location at the corresponding location on the map. The processor may also update the status message associated with the first avatar to reflect the geographic location or an activity related to the geographic location. In this embodiment, the processor performs the updates to the map interface without the receiving the inputs from the first client device (e.g., selecting the location, selecting the version of the first avatar, etc.). In one embodiment, the processor stores the locations on the map interface that are associated with the first user in a storage.

Software Architecture

Figure 6:
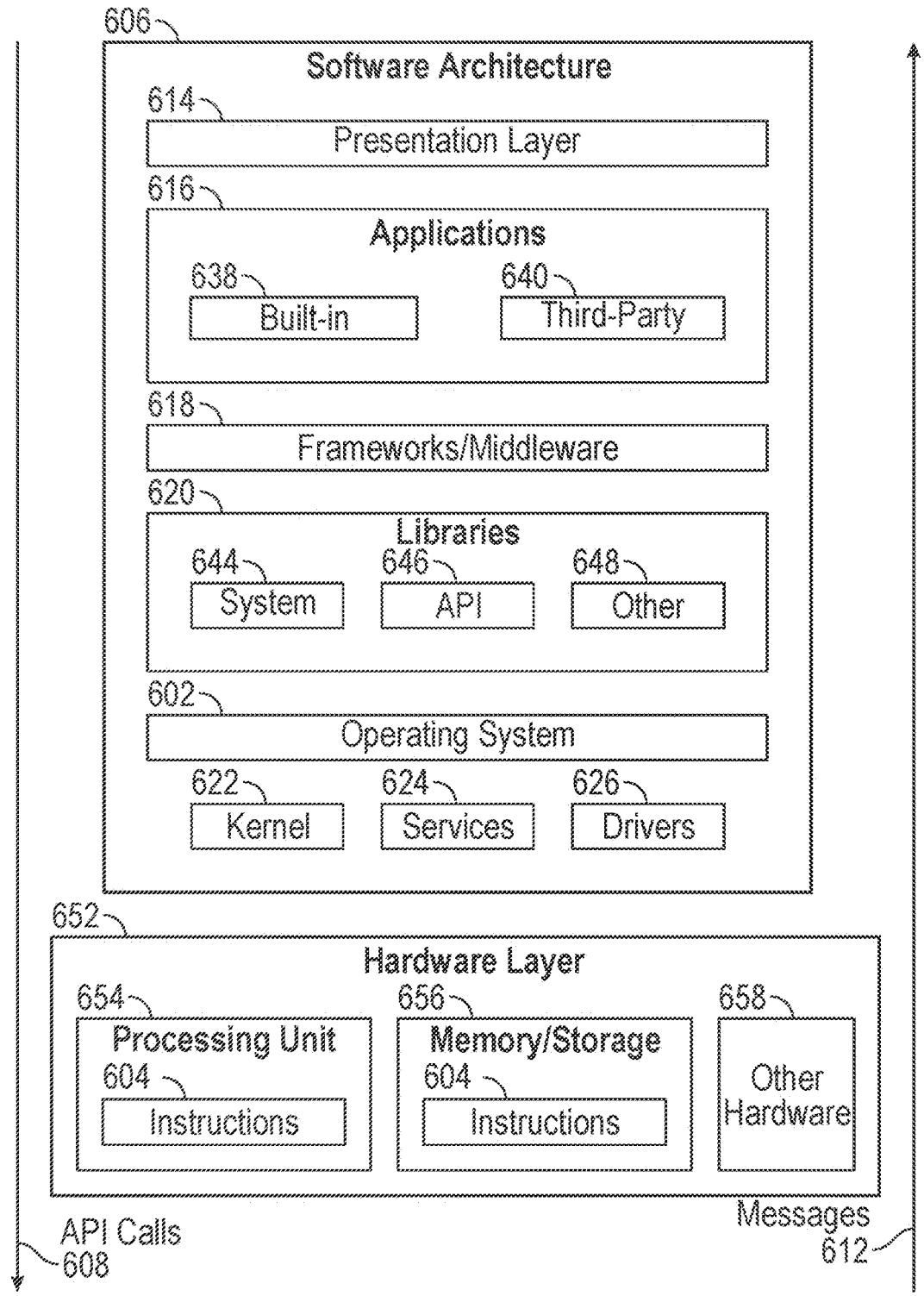
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
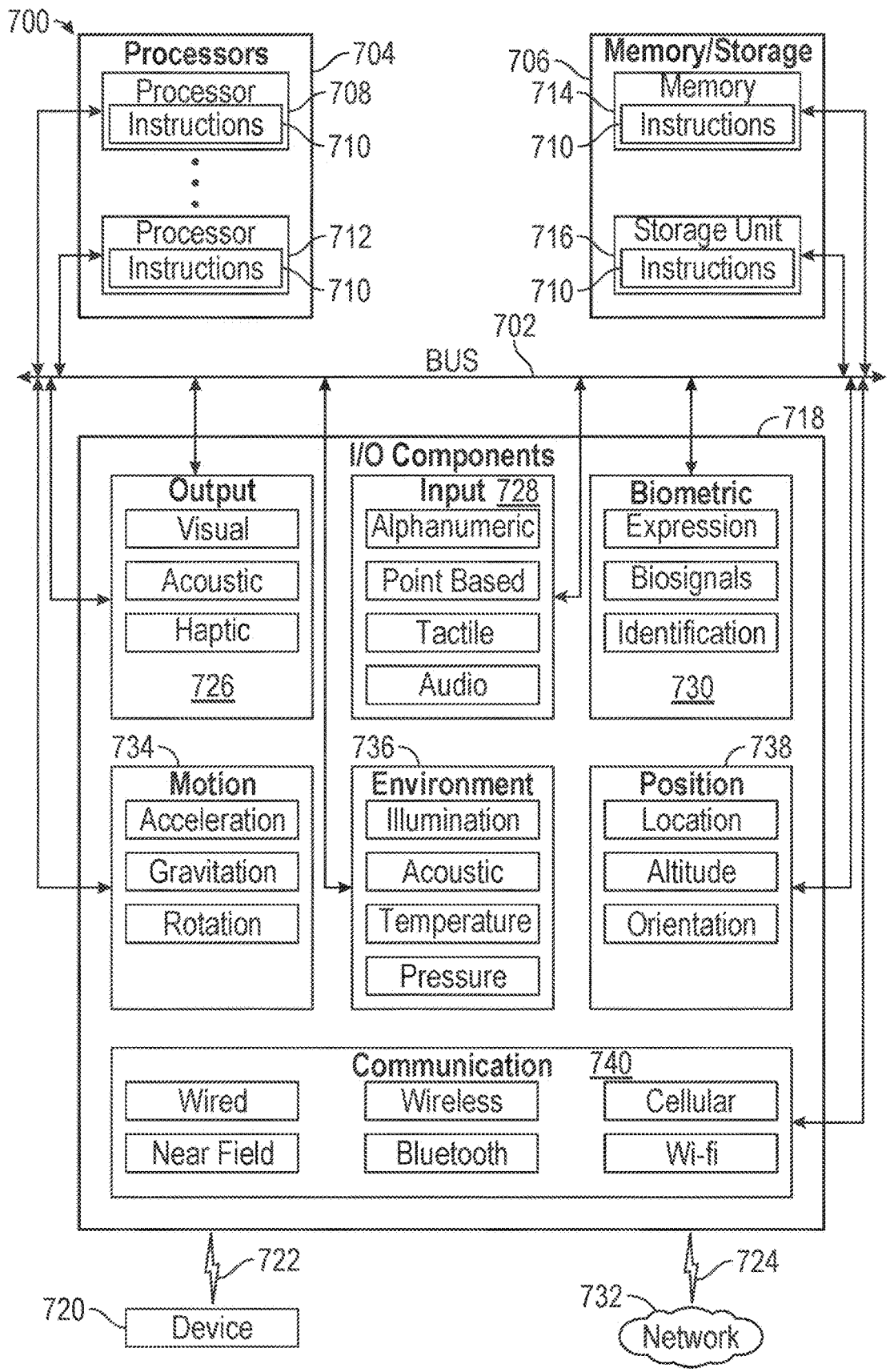
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combination thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
a processor; and
a memory having instructions stored thereon, when executed by a processor, causes the system to perform operations comprising:
receiving from a first client device location information indicating a location of the first client device;
causing an activity selection interface to be displayed on the first client device, wherein the activity selection interface includes a plurality of selectable activity icons corresponding to a plurality of activities, wherein each selectable activity icon includes an image representing one of the plurality of activities;
receiving a selection from the first client device of a first selectable activity icon corresponding to a first activity;
generating a map interface that includes a map display based on the location information and the first activity, the map interface including a first avatar displayed at a corresponding location on the map display, wherein the first avatar is depicted as engaging in the first activity; and
causing the map interface to be displayed on a plurality of client devices including the first client device.

2. The system of claim 1, wherein the first avatar is associated with a first user of the first client device.

3. The system of claim 1, wherein the memory further comprises instructions that, when executed by the processor, cause the system to perform additional operations comprising:
receiving a selection of a version of the first avatar from an avatar selection interface, wherein the avatar selection interface includes a plurality of versions of the first avatar engaging in the first activity; and
generating the map interface to include the selected version of the first avatar.

4. The system of claim 1, wherein the memory further comprises instructions that, when executed by the processor, cause the system to perform additional operations comprising:
receiving a first media content item associated with the first activity; and
generating the map interface to include a preview item of the first media content item.

5. The system of claim 1, wherein the memory further comprises instructions that, when executed by the processor, cause the system to perform additional operations comprising:
receiving from a second client device second location information indicating a second location of the second client device;
determining that the second location is within a threshold distance of the location of the first client device; and
generating the map interface to include a second avatar associated with a second user of the second client device, the second avatar displayed at a location on the map display corresponding to the second location.

6. The system of claim 5, wherein the memory further comprises instructions that, when executed by the processor, cause the system to perform additional operations comprising:
receiving a selection of the second avatar; and
initiating a communication session between the first client device and the second client device in response to the selection of the second avatar.

7. The system of claim 1, wherein the memory further comprises instructions that, when executed by the processor, cause the system to perform additional operations comprising:
receiving a second media content item including a geolocation; and
generating the map interface to include a second avatar engaging in an activity related to the geolocation at a location on the map display corresponding to the geolocation, without receiving a selection of an activity icon corresponding to the activity.

8. A computer-implemented method comprising:
receiving from a first client device location information indicating a location of the first client device;
causing an activity selection interface to be displayed on the first client device, wherein the activity selection interface includes a plurality of selectable activity icons corresponding to a plurality of activities, wherein each selectable activity icon includes an image representing one of the plurality of activities;
receiving a selection from the first client device of a first selectable activity icon corresponding to a first activity;
generating a map interface that includes a map display based on the location information and the first activity, the map interface including a first avatar displayed at a corresponding location on the map display, wherein the first avatar is depicted as engaging in the first activity; and
causing the map interface to be displayed on a plurality of client devices including the first client device.

9. The method of claim 8, wherein the first avatar is associated with a first user of the first client device.

10. The method of claim 8, further comprising:
receiving a selection of a version of the first avatar from an avatar selection interface, wherein the avatar selection interface includes a plurality of versions of the first avatar engaging in the first activity; and
generating the map interface to include the selected version of the first avatar.

11. The method of claim 8, further comprising:
receiving a first media content item associated with the first activity; and
generating the map interface to include a preview item of the first media content item.

12. The method of claim 8, further comprising:
receiving from a second client device second location information indicating a second location of the second client device;
determining that the second location is within a threshold distance of the location of the first client device; and
generating the map interface to include a second avatar associated with a second user of the second client device, the second avatar displayed at a location on the map display corresponding to the second location.

13. The method of claim 12, further comprising:
receiving a selection of the second avatar; and
initiating a communication session between the first client device and the second client device in response to the selection of the second avatar.

14. The method of claim 8, further comprising:
receiving a second media content item including a geolocation; and
generating the map interface to include a second avatar engaging in an activity related to the geolocation at a location on the map display corresponding to the geolocation, without receiving a selection of an activity icon corresponding to the activity.

15. A system comprising:
means for receiving from a first client device location information indicating a location of the first client device;
means for causing an activity selection interface to be displayed on the first client device, wherein the activity selection interface includes a plurality of selectable activity icons corresponding to a plurality of activities, wherein each selectable activity icon includes an image representing one of the plurality of activities;
means for receiving a selection from the first client device of a first selectable activity icon corresponding to a first activity;
means for generating a map interface that includes a map display based on the location information and the first activity, the map interface including a first avatar displayed at a corresponding location on the map display, wherein the first avatar is depicted as engaging in the first activity; and
means for causing the map interface to be displayed on a plurality of client devices including the first client device.

16. The system of claim 15, wherein the first avatar is associated with a first user of the first client device.

17. The system of claim 15, further comprising:
means for receiving a selection of a version of the first avatar from an avatar selection interface, wherein the avatar selection interface includes a plurality of versions of the first avatar engaging in the first activity; and
means for generating the map interface to include the selected version of the first avatar.

18. The system of claim 15, further comprising:
means for receiving a first media content item associated with the first activity; and
means for generating the map interface to include a preview item of the first media content item.

19. The system of claim 15, further comprising:

means for receiving from a second client device second location information indicating a second location of the second client device;

means for determining that the second location is within a threshold distance of the location of the first client device; and means for generating the map interface to include a second avatar associated with a second user of the second client device, the second avatar displayed at a location on the map display corresponding to the second location.

20. The system of claim 19, further comprising:

means for receiving a selection of the second avatar; and means for initiating a communication session between the first client device and the second client device in response to the selection of the second avatar.

* * * * *